July 22, 1952     S. E. ROBBINS ET AL     2,604,287
FISHING ROD HOLDER

Filed Oct. 29, 1949     2 SHEETS—SHEET 1

SAM E. ROBBINS &
FRANK L. LARSON
Inventors

Smith & Tuck
Attorneys

July 22, 1952  S. E. ROBBINS ET AL  2,604,287
FISHING ROD HOLDER
Filed Oct. 29, 1949  2 SHEETS—SHEET 2
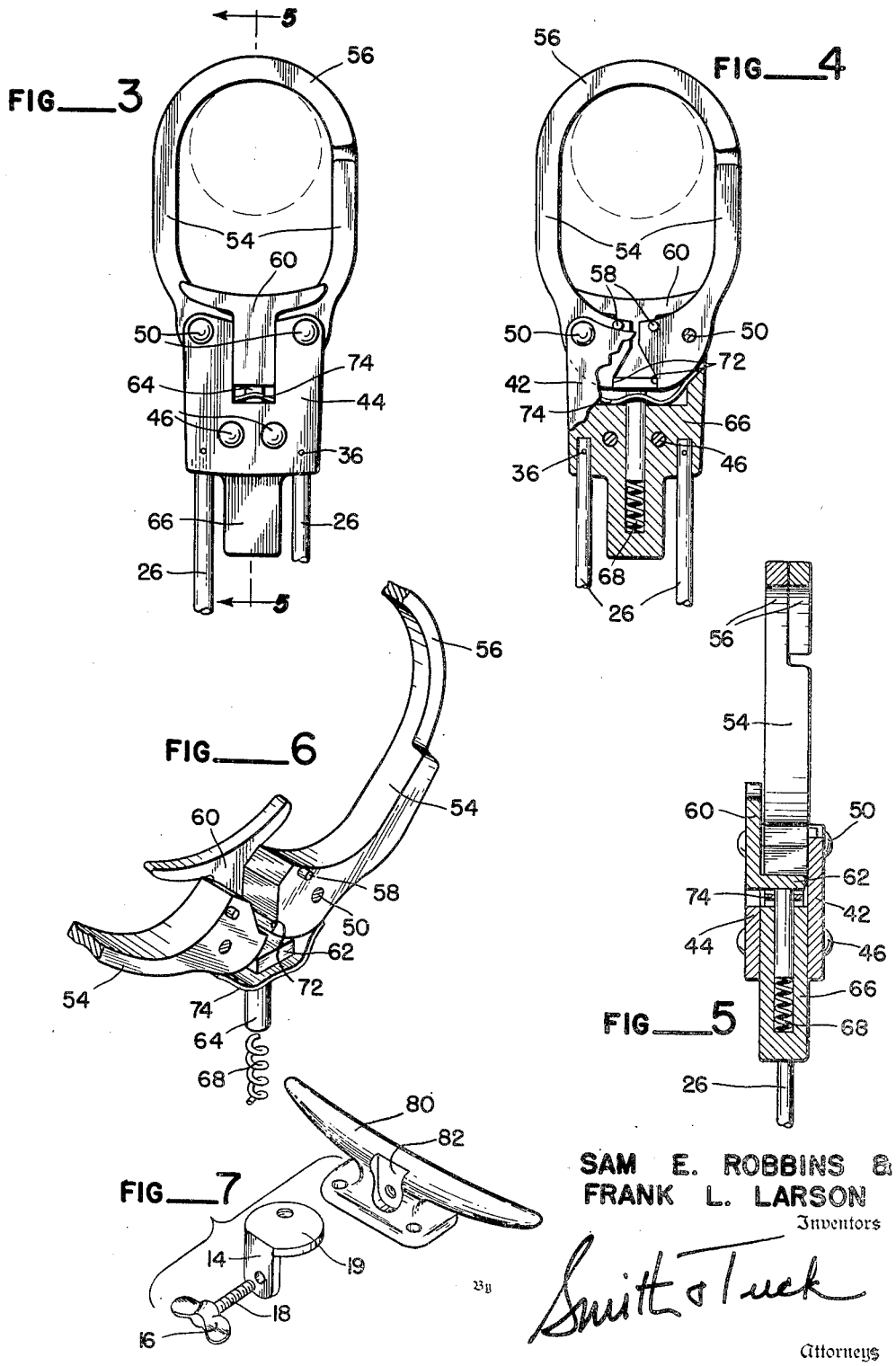
SAM E. ROBBINS &
FRANK L. LARSON
Inventors
Smith &Tuck
Attorneys Patented July 22, 1952

2,604,287

UNITED STATES PATENT OFFICE 2,604,287

FISHING ROD HOLDER

Sam E. Robbins and Frank L. Larson, Seattle, Wash.

Application October 29, 1949, Serial No. 124,316

4 Claims. (Cl. 248—42)

Our invention relates to a fishing rod holder and, more particularly, to a quick-release clamp for a fishing rod butt and useful in a conventional U-shaped holder that is normally provided with means for attaching the holder to a boat.

It is desirable, when a fisherman gets a strike, to have the fishing rod free for manipulation without delay. At the same time during intervals between strikes it is often preferable or convenient for the fisherman to dispose of his rod in a holder so that he may be free of it. Such a holder normally is arranged so that the rod can be maintained in a great variety of positions. Various types of holders have been devised but my experience has been that such retaining means as has been incorporated to prevent the accidental displacement of the rod from the holder are complicated to use and often result in the fish coming unhooked before the fisherman can properly "set" the hook. Or they hold the rod too lightly and loss of the rod is a real possibility. It should be apparent, therefore, that it is highly desirable that a good rod holder not only safely and securely retain the butt portion of the rod, but, also that it be capable of quickly and simply freeing the rod when such is desired by the fisherman.

It is among the objects of this invention, therefore, to provide a fishing rod holder, of the type having a U-shaped body and a forked forward holder, with a quick-release clamp to secure a fishing rod but firmly in position yet readily releasable when a strike is made. At the same time it is desirable to have a simple, inexpensive clamp of sturdy build and attractive appearance. The clamp should be easy to operate.

These and other objects are met in our invention by providing a two-claw rear clamp in a fishing rod holder which functions after the manner of a "sister hook." The butt of the fishing rod is held firmly by opposing upright jaws or claws pivotally mounted on a base. The claws have oppositely cut out upper portions permitting them to lap each other. A slidable latch actuator is mounted vertically on the base with a latching flange extending between the inner lower surfaces of the claws below the pivot when the latch actuator is in an upper position and the claws are closed thereby holding the claws in a closed position. Downward movement of the latch actuator will release the claws and a spring mechanism is provided to swing the claws open when they are released. The top of the latch actuator extends to a level above the base of the claw enclosure so that it may be moved downward by pressure of a fishing rod butt held in the enclosure.

When there is a strike the fisherman merely presses the butt of the rod downward on the latch actuator, the claws swing open, and the fishing rod is free and ready for action. When he wants to mount his rod he places it on the clamp and brings the claws together about the butt and cradles the forward portion in the usual cradling fork ahead of the clamp.

Our invention will be best understood from the following description when read with reference to the accompanying drawings, in which:

Figure 3 is a side view of the rod clamp;

Figure 4 is a view of the opposite side of the rod clamp;

Figure 5 is a cross-sectional end view of the rod clamp;

Figure 6 is a perspective view of the latch portion of the rod clamp; and

Figure 7 is an exploded perspective view of an alternate attaching means for mounting our rod holder on a vessel.

Figure 1:
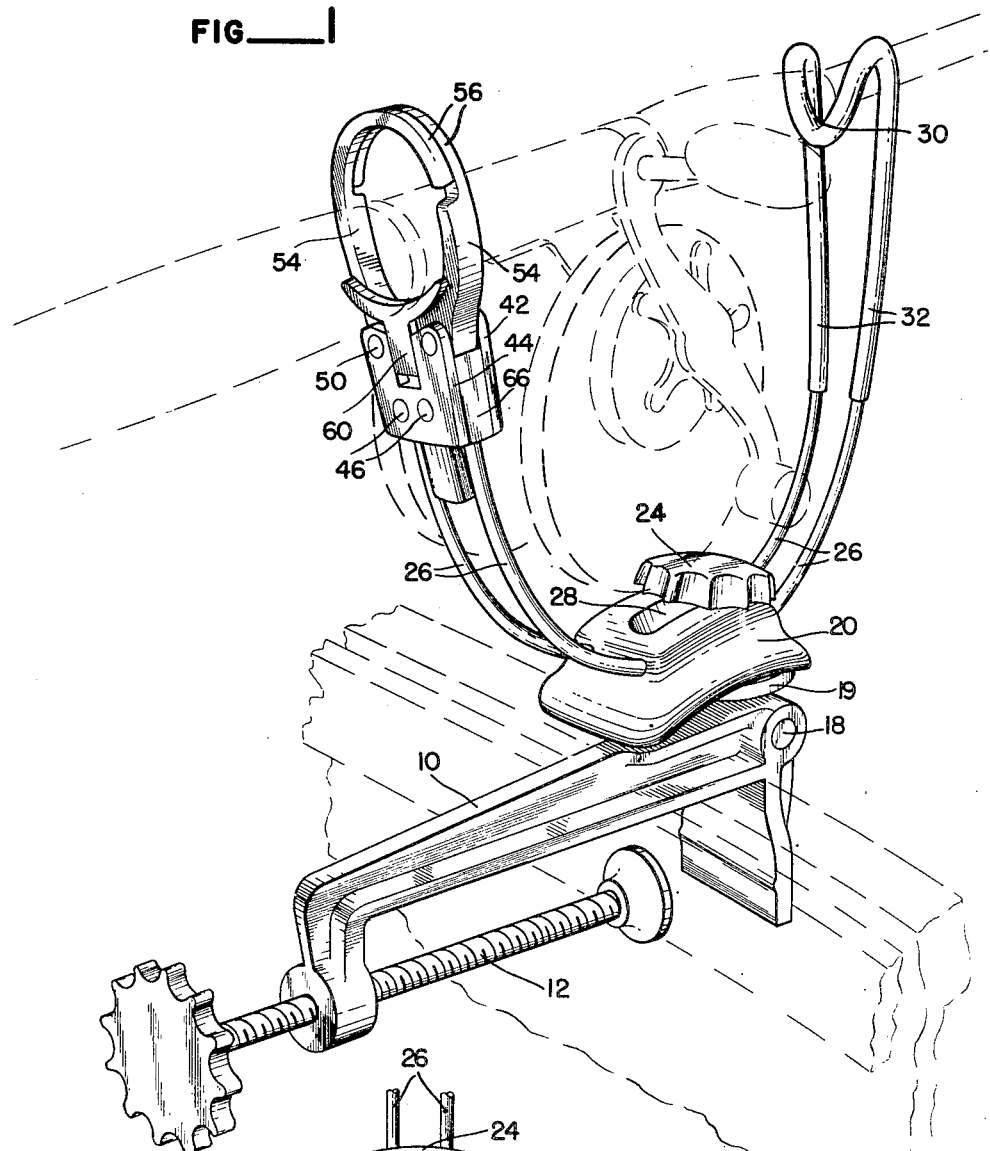
Figure 1 is a perspective view of a fishing rod holder constructed according to the teachings of our invention.
Figure 2:
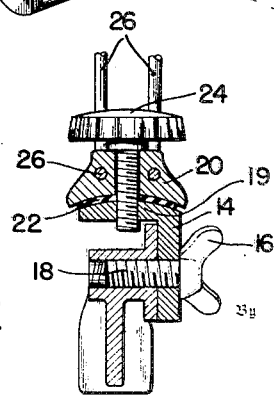
Figure 2 is a sectional elevation view of the substantially universal means for adjusting the position of the holder.

Referring to Figure 1, there is shown a U-shaped fishing rod holder constructed according to the teachings of our invention. The boat attaching clamp 10 is generally C-shaped and has a threaded rod 12 attached to the inner side of the longer leg of the C, directed toward the shorter leg to clamp a board on the boat between the short leg and the adjacent end of the threaded rod 12.

Pivotally mounted on the boat clamp 10 is an angle plate 14. The pivotal connection is made by a bolt 18 set transversely in the corner of the boat clamp 10, having a threaded end extending through the leg of the angle plate 14, and having a wing head 16 outside of the angle plate 14.

The transverse arm 19 of the angle plate 14 overlies the boat clamp 10 and has a convex upper surface. A socket member 20, forming the rod holder base is pivotally mounted on the convex surface of the angle plate 14 by a vertical set screw 24. The opening 28 through the socket member 20 for the set screw is elongated to permit sliding of the socket member 20 relative to the set screw 24. An elastic washer 22 separates the socket member 20 and the convex surface of the angle plate 14.

The U-shaped holder 26 is formed of two rods passing through the socket member 20 with upward directed ends. One end of the rods are joined in the form of a fork 30 to hold a forward portion of the fishing rod. The fork 30 is preferably covered by an elastic coating 32 to avoid damaging the surface of the rod.

While this is a preferred construction it will be apparent that the U-shaped holder 26 and the clamping assembly may be in various other forms.

The rod clamp has a base to which the rear end of the U-shaped rods are attached. The base is made of a central block 66 and plates 42, 44, secured on either side of the central block by rivets 50, 46. The rods are inserted in openings in the central block 66 and held in place by pins 36 passing through the plates 42, 44, the central block 66, and the rods.

Two opposing upright claws 54 are pivotally mounted above the central block 66 between the flat plates 42, 44, at opposite sides. The claws 54 are pivoted on the upper rivets 50 that hold the flat plates 42, 44 together. The upper portions 56 of the claws 54 are oppositely cut out so that the claws 54 will lap each other. Spring means 74 is provided in the base bearing against the outer lower surfaces of the claws 54 below the pivotal connection tending to force the claws open. Projections 58, on the lower side of the claws 54 contiguous with one of plates 42 when the claws are in a closed position, provide means for preventing further closure of the claws.

A latch actuator 60 is slidably mounted vertically in one plate 44. A latching flange 62 on the latch actuator 60 extends between the lower inside portions of the claws 54 below the pivotal connection. This surface of the claws 54 is notched at 72 to fit the latching flange 62. When the latching flange 62 is in an upper position between the lower surfaces of the claws 54 it prevents the opening of the claws. When the latching flange 62 is moved downward the claws 54 are released.

The latching flange 62 is mounted on a vertical rod 64 which is slidably positioned in the central block 66. There is a spring 68, set in the central block 66, bearing on the lower end of the vertical rod 64 and tending to force it upwards.

The lower outside portions of the claws 54 have a concave surface. When the claws 54 are moved to a closed position, this surface bears on the latching flange 62 forcing it downward until the claws 54 are nearly upright. At this point the portion of the claw surface that is notched at 72 is reached and the latching flange 62 moves upward latching the claws 54.

The upper portion of the latch actuator 60 forms a T. The top of the T spans the lower portion of the space enclosed by the claws 54. A fishing rod butt within the claws 54 would normally rest in the upper part of the claw enclosure due to the weight of the extended fishing pole. To release the claws 54 the butt is pressed against the top of the T portion of the latch actuator 60, and latch actuator and latching flange 62 move downward freeing the claws, and, the fishing rod is free for action.

The latch actuator could be constructed without the extended T portion and instead have an external flange to be operated by hand. The base of the fishing rod clamp does not have to be in three portions as the two flat plates and the central block could be constructed in one piece.

It can be seen from the above description that our invention is a fishing rod holder with a clamp that holds the fishing rod butt firmly in position, but is readily releasable by pressing down on the fishing rod butt. The design is simple and sturdy, hence, inexpensive to construct and maintain. This fishing rod holder, at the same time, presents an attractive appearance.

As shown in Figure 7, the rod-holder may be clamped or secured to a vessel in an alternative manner. Boat cleat 80 has a recess 82 which receives the leg of angle plate 14, where it is held by bolt 18. The overlying convexly curved flange 19 of plate 14 may either overlie the cleat or be disposed laterally to one side thereof. In either case, the socket member 20 is attached to plate 14 as has been described.

While the present invention has been shown and described as embodied in a specific construction, it is to be understood that the invention is not limited thereto, but may be embodied in other constructions, and the form and arrangement of the several parts thereof may be varied within the limits defined by the appended claims.

What is claimed is:

1. In a fishing rod holder of the type having a U-shaped body with means to clamp said body to a boat, the combination, comprising: the forward end of said U-shaped body being forked forming a rest which is open at its top so that a fishing rod positioned in said rest may be removed by movement upwards, a clamp base on the rear end of said U-shaped body, opposed upright claws pivotally mounted in spaced apart relation to each other on said base to pivot in a common plane, a latch actuator mounted on said base in a plane offset to the plane of said claws, said latch actuator being vertically slidable between an upper latching position and a lower position, said latch actuator having a latching flange extending inwardly to the plane of said claws, said latching flange in its upper position bearing on the inner surfaces of said claws below their pivots when the claws are closed so as to lock said claws, the lower portions of said claws being in the form of inwardly directed horns forming curved outer surfaces of such shape and so positioned when the claws are open that said latching flange in moving to said upper position will not close said claws, an upper portion of said latch actuator spanning the lower portion of the space between the claws, whereby the claws may be released by downward movement of a fishing rod butt in said space against said upper portion of said latch actuator, and a spring in said base bearing against said latch actuator to bias it upwards.

2. A releasable fishing rod clamp, for use at the rear end of a U-shaped fishing rod holder having a forked forward end, comprising, a base, opposed upright claws pivotally mounted in spaced apart relation to each other on said base to pivot in a common plane, a latch actuator mounted on said base in a plane offset to the plane of said claws, said latch actuator being vertically slidable between an upper latching position and a lower position, said latch actuator having a latching flange extending inwardly to the plane of said claws, said latching flange in its upper position bearing on the inner surface of said claws below their pivots when the claws are closed so as to lock said claws, the lower outer surfaces of said claws being convex forming cam surfaces whereby the latching flange will be depressed as the claws move from an open to a closed position, said cam surfaces being so shaped and positioned when the claws are open that said latching flange in moving to an upper position will not close said claws, an upper portion of said latch actuator spanning the lower portion of the space between the claws, whereby the claws may be released by downward movement of a fishing rod butt in said space against said upper portion of said latch actuator, and a spring in said base bearing against said latch actuator to bias it upwards.

3. In a fishing rod holder of the type having a U-shaped body with means to clamp said body to a boat, the combination comprising: the forward end of said U-shaped body being forked forming a rest which is open at its top so that a fishing rod positioned in said rest may be removed by movement upwards, a clamp base on the rear end of said U-shaped body, opposed upright claws pivotally mounted in spaced apart relation to each other on said base to pivot in a common plane, a latch actuator having a claw latching portion, said latch actuator being mounted on said base and being vertically slidable between an upper latching position and a lower position, said latching portion in its upper position bearing on the inner surfaces of said claws below their pivots when the claws are closed so as to lock said claws, the lower outer surfaces of said claws being so shaped and being so positioned when the claws are open that said latching portion in moving to said upper position will not close said claws, an upper portion of said latch actuator spanning the lower portion of the space between the claws, whereby the claws may be released by downward movement of a fishing rod butt in said space against said upper portion of said latch actuator, a spring in said base bearing against said latch actuator to bias it upwards, and spring means in said base to bias the upper portions of said claws outward.

4. A releasable fishing rod clamp, for use at the rear end of a U-shaped fishing rod holder having a forked forward end, comprising: a base, opposed upright claws pivotally mounted in spaced apart relation to each other on said base to pivot in a common plane, a latch actuator having a claw latching portion, said latch actuator being mounted on said base and being vertically slidable between an upper latching position and a lower position, said latching portion in its upper position bearing on the inner surfaces of said claws below their pivots when the claws are closed so as to lock said claws, the outer surfaces of said claws being so shaped and being so positioned when the claws are open that said latching portion in moving to said upper position will not close said claws, an upper portion of said latch actuator spanning the lower portion of the space between the claws, whereby the claws may be released by downward movement of a fishing rod butt in said space against said upper portion of said latch actuator, a spring in said base bearing against said latch actuator to bias it upwards, and spring means in said base to bias the upper portions of said claws outward.

SAM E. ROBBINS.
FRANK L. LARSON.

REFERENCES CITED

The following references are of record in the file of this patent:

UNITED STATES PATENTS

| Number | Name | Date |
| --- | --- | --- |
| 1,000,868 | Williams | Aug. 15, 1911 |
| 2,220,234 | Hadaway | Nov. 5, 1940 |
| 2,301,885 | Laehr | Nov. 10, 1942 |
| 2,430,112 | Hamre | Nov. 4, 1947 |